June 7, 1932. K. J. LAGESON 1,862,187

BAIT HALTER

Filed April 13, 1931

INVENTOR.
KNUTE J. LAGESON.
BY HIS ATTORNEYS.
Williamson & Williamson

Patented June 7, 1932

1,862,187

UNITED STATES PATENT OFFICE

KNUTE J. LAGESON, OF MINNEAPOLIS, MINNESOTA

BAIT HALTER

Application filed April 13, 1931. Serial No. 529,581.

This invention relates to live bait halters for fishing.

It is the object of the invention to provide a novel and improved live bait halter for fishing, whereby a live bait, such as a frog or minnow, can be kept alive for a long period of time and will have freedom for natural movement in the water.

The objects and advantages of the invention will more fully appear from the following description, made in connection with the accompanying drawing, wherein like reference characters refer to the same or similar parts throughout the various views, and, in which, Fig. 1 is a plan view of the halter with a frog indicated in dotted lines held by the halter, the legs of the frog being shown in two different positions;

Figure 1:
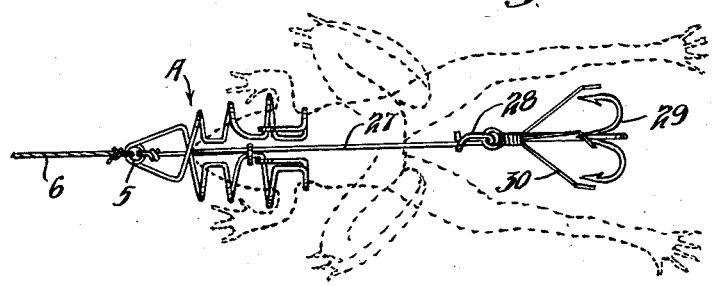

Referring to the drawing, there is illustrated a spring wire A suitably bent to form a cage comprising the main portion of the halter. This wire at the forward end of the cage is turned at its medial portion to form a combined helical spring and eye 5 to which a fish line or leader 6 may be secured. From the eye 5, portions of the wire A project laterally, outwardly and rearwardly to form finger grip portions 7 and 8, oppositely opposed from each other. Portions 9 and 10 crossing each other extend from the rear ends of the thumb grip portions 7 and 8 respectively. The portion of the wire A joining the rear end of the crossing portion 9 is first curved outwardly, downwardly and then inwardly to form a turn 11 and then bent rearwardly to form a bottom loop 12. From the rear end of the bottom loop 12, the wire is curved outwardly, upwardly and inwardly to form a turn 13 joining an upper rearwardly extending loop 14. From the rear end of the loop 14, the wire is curved outwardly, downwardly and inwardly to form a turn 15 from which a rearwardly extending portion 16 projects. From the rear end of the portion 16, the wire curves upwardly, first outwardly and then inwardly to form a semi-circular clamping jaw 17. A forwardly extending portion 18 joins the upper end of the clamping jaw 17 and projects forwardly and is secured to the rear portion of the loop 14. The portion of the wire A joining the rear end of the crossing portion 10 is first curved outwardly, upwardly and then inwardly to form a turn 19 joining an upper rearwardly extending loop 20. The wire extends outwardly, downwardly and then inwardly from the rear end of the loop 20 to form turn 21 joining a lower rearwardly extending loop 22. From the rear end of the loop 22, the wire curves upwardly, outwardly and then inwardly to form a turn 23 joining a rearwardly extending portion 24. The wire extends from the rear end of the portion 24 outwardly, downwardly and then inwardly in a semi-circle to form a clamping jaw 25 opposed to the clamping jaw 17. A forwardly extending portion 26, projects from the lower end of the jaw 25 and is secured to the loop 22. The turns 13 and 21 are of slightly greater diameter than the turns 11 and 19, while the turns 15 and 23 are of slightly greater diameter than the turns 13 and 21. The two jaws 17 and 25 are of considerably less diameter than turns 15 and 23 and are, accordingly, more closely inwardly disposed than the turns 15 and 23. With the construction described, it will be seen that a split cage is provided, the two members of which have oppositely disposed jaws 17 and 25 at their rear ends and are interconnected at their forward ends resiliently, so that the two jaws 17 and 25 will be urged toward each other. Connected to the eye 5 is a wire 27 which extends rearwardly and somewhat downwardly from the eye. This wire has a short forwardly extending portion at its rear end forming a loop 28 which is bent to snap over the rearwardly extending portion of the wire. A treble fish hook 29 is secured to loop 28 and projects rearwardly therefrom and preferably the fish hook 29 is a weedless hook equipped with the springs 30 running from the shank of the hook to points outwardly disposed from the pointed ends of the hook. A small ring 31 encompasses both the wire 27 and the loop 22.

When a frog is to be inserted in place within the halter, the fisherman will grasp the finger grip portions 7 and 8 with one hand and press these two portions together against the tension of the spring wire A. This will spread the two jaws 17 and 25 apart whereupon a frog held in the other hand of the fisherman may be placed with his head within the cage. The two forelegs or arms of the frog will be extended through the space afforded respectively between the jaw 17 and the turn 15 and the jaw 25 and the turn 23, as illustrated in Fig. 1. The finger grip portions 7 and 8 may then be released whereupon the two jaws 17 and 25 will clamp against the frog rearwardly from the arms of the frog. This portion of the frog is quite soft and the two jaws will thus effectively clamp the frog in place. The frog immediately forwardly of the arms has quite a bony structure and for this reason the turns 15 and 23 are projected outwardly beyond the respective clamping jaws 17 and 25 so that the turns 15 and 23 will have no clamping action on the frog. The turns 11, 13 and 15 and 19, 21 and 23 will, however, center the head of the frog in the cage and will prevent the frog from turning and releasing itself from the cage. The back of the frog will, of course, be disposed upwardly and the portions 16, 18, 24 and 26 will prevent the frog from twisting to any appreciable extent in the halter. The legs of the frog will, at all times, remain free, so that the movement thereof will be unobstructed. The hook 29 will extend between the rear legs, as shown, when these legs are extended. When the bait is drawn through the water, the finger grip portions 7 and 8 together with the two sections of the cage will prevent the bait from catching on weeds, lily pads or the like, and if the hook 29 used, is a weedless hook, it will be possible to draw the bait through the thickest weeds without interference. As a fish strikes at the bait, it will be caught by the hook 29. It is natural for the fish as soon as hooked, to attempt to spit the frog out of its mouth and this may be readily done as there is no direct connection between the hook 29 and the frog. When the fish is hooked, the pull from the line 6 will be directly transmitted to the hook through the wire 27 and if the fish has spit out the frog, the frog will not be torn or injured while the fish is being drawn toward the fisherman. The ring 31 connecting the wire 27 with the loop 22 permits limited swinging movement of the wire 27 relative to the cage, when the fish is hooked but at the same time the ring maintains the hook between the rear legs of the frog prior to the time that the fish is hooked. As the frog will usually not be chewed by the fish, after the fish is once hooked, it is often possible to use a single frog for catching several fish. It will, of course, be impossible for a frog to escape from the halter after once being properly clamped and placed therein. The jaws 17 and 25 prevent the frog from pulling backwardly from the cage, while the various turns of the cage prevent the frog from pulling sufficiently forwardly to release its front legs or arms from between the jaws and the turns 15 and 23.

Figure 2:
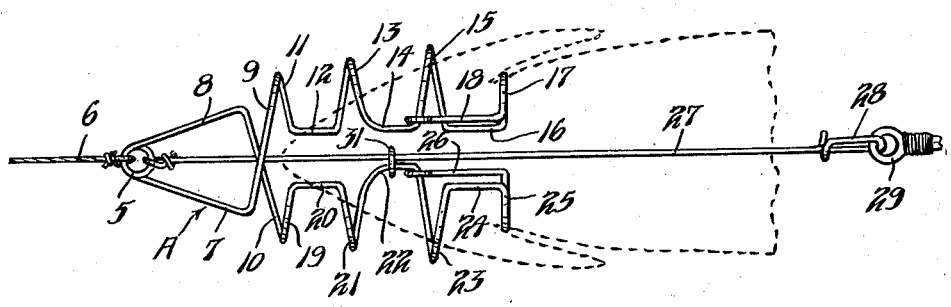
Fig. 2 is a similar view on a larger scale illustrating a minnow held in place by the halter.
Figure 3:
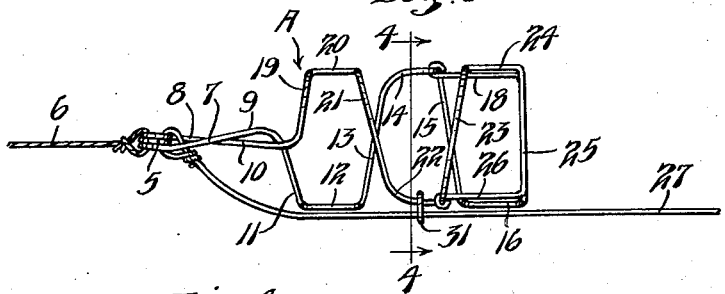
Fig. 3 is a view in side elevation of the halter, the hook not being shown.
Figure 4:
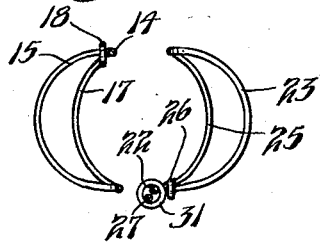
Fig. 4 is a vertical section taken on the line 4—4 of Fig. 3, as indicated by the arrows.

Although the bait halter is primarily intended for use in connection with frogs, it may be also used for holding other live bait. In Fig. 2, a minnow is shown held in place by the halter. The jaws 17 and 25 will be inserted beneath the gills of the minnow, the gills being projected outwardly through the open spaces between the respective jaws 17 and 25 and the turns 15 and 23. With the minnow clamped in this manner, in the halter, it will be seen that it is imposible for the minnow either to turn or to escape from the halter. The rear portion of the minnow will remain free, however, so that the minnow may swim through the water.

It will, of course, be understood that any type of hook may be substituted for the particular hook 29 shown. The construction of the cage may be considerably altered if desired.

It will, of course, be understood that various changes may be made in the form, details, arrangement and proportions of the various parts without departing from the scope of the present invention which, generally stated, consists in the matter shown and described and set forth in the appended claims.

What is claimed is:—

1. A live bait halter for fishing, comprising a pair of oppositely disposed cage members, between which the head of a live bait may be placed, a spring member having an eye to which a line may be attached and having oppositely disposed arms normally projecting laterally outwardly and rearwardly from said eye, said arms having portions crossing each other and respectively joining forward ends of said cage members, said cage members having open portions in their sides adjacent their rear ends through which projecting portions of a live bait may be extended, and a hook having connection with said eye and projecting rearwardly from said cage members.

2. A live bait halter for fishing including a pair of oppositely disposed cage members resiliently connected together at their forward ends to be spread apart at their rear ends, said cage members having clamping jaws at their rear ends to engage against portions of a live bait and said cage members having laterally extending portions spaced forwardly from said jaws and projecting outwardly beyond the sides of said jaws to permit insertion of projecting portions of a live bait between said jaws and said laterally extending portions, said jaws acting to clamp the bait and said laterally extending portions acting to center the bait without clamping it and a fish hook attached to said members.

3. A live bait halter for fishing, comprising a pair of oppositely disposed cage members constructed from resilient wire and having their forward ends connected to permit spreading of the rear ends of the cage members for insertion of the head of a live bait between the same, said cage members having oppositely disposed clamping jaws at their rear ends and having portions projecting outwardly laterally from said clamping jaws in forwardly spaced relation therefrom to permit insertion of the projecting portions of a live bait laterally between said jaws and said forwardly projecting portions, a wire secured to the forward ends of said cage portions and projecting rearwardly therefrom, a fish hook secured to the rear end of said wire and a ring loosely encompassing said wire and the bottom portion of one of said cage members to permit lateral relative movement between said wire and said cage members.

4. A live bait halter for fishing, comprising a spring wire bent at its forward ends to form an eye to which a line may be attached and having diagonally rearwardly and outwardly extending lateral finger grip portions projecting from said eye, said lateral portions being joined to portions crossing each other and projecting rearwardly from said finger grip portions and respectively joining oppositely disposed cage members, the rear ends of said cage members forming oppositely disposed clamping jaws rearwardly and inwardly spaced from the widest portions of said cage members disposed immediately forwardly from said jaws, a wire secured to said eye at its forward end and projecting rearwardly therefrom, a fish hook secured to the rear end of said last mentioned wire and a ring encompassing said last mentioned wire and a lower portion of one of said cage members.

5. A live bait halter for fishing, comprising a pair of oppositely disposed cage members resiliently connected together at their forward ends, said cage members having clamping jaws at their rear ends to be spread apart to resiliently engage against portions of a live bait, a wire connected to the forward ends of said cage members and extending below the same, a fish hook secured to the rear end of said wire, and a ring encompassing said wire and a bottom portion of one of said members.

6. A live bait halter for fishing, comprising a pair of substantially oppositely disposed clamping jaws, resilient wires running forwardly from said clamping jaws and connected at their forward ends to permit spreading of said jaws against the tension of said wires for insertion of a bait between the jaws, means at the forward ends of said wires for permitting a line to be connected thereto, a wire connected at its forward end to the forward ends of said first mentioned wires and normally extending rearwardly substantially midway transversely between said first mentioned wires and a hook swingably connected to the rear portion of said last mentioned wire, said last mentioned wire being confined to permit limited lateral sliding movement of the rear portion of the same relative to said jaws.

In testimony whereof I affix my signature.

KNUTE J. LAGESON.